(12) United States Patent
Lubda et al.

(10) Patent No.: US 7,238,310 B2
(45) Date of Patent: Jul. 3, 2007

(54) PROCESS FOR PRODUCING AN INORGANIC MONOLITHIC MOLDING

(75) Inventors: Dieter Lubda, Bensheim (DE); Karin Cabrera, Dreieich (DE)

(73) Assignee: Merck Patent GmbH, Darmstadt (DE)

( * ) Notice: Subject to any disclaimer, the term of this patent is extended or adjusted under 35 U.S.C. 154(b) by 559 days.

(21) Appl. No.: 10/311,708

(22) PCT Filed: May 23, 2001

(86) PCT No.: PCT/EP01/05914

§ 371 (c)(1),
(2), (4) Date: Dec. 19, 2002

(87) PCT Pub. No.: WO02/00562

PCT Pub. Date: Jan. 3, 2002

(65) Prior Publication Data
US 2003/0172674 A1 Sep. 18, 2003

(30) Foreign Application Priority Data
Jun. 23, 2000 (DE) ................................. 100 30 665

(51) Int. Cl.
B28B 7/36 (2006.01)

(52) U.S. Cl. ...................... 264/42; 106/38.22; 264/338; 427/215

(58) Field of Classification Search ................. 264/42, 264/338; 106/38.22; 427/215
See application file for complete search history.

(56) References Cited

U.S. PATENT DOCUMENTS

| 3,922,392 A | | 11/1975 | Unger et al. |
| 4,274,856 A | * | 6/1981 | Frey et al. ........................ 65/24 |
| 4,277,299 A | * | 7/1981 | Cherenko et al. ............. 156/242 |
| 4,684,385 A | * | 8/1987 | Clasen ........................ 264/1.21 |
| 4,840,653 A | * | 6/1989 | Rabinovich ................... 65/395 |
| 4,859,525 A | * | 8/1989 | Hench et al. ................ 442/172 |
| 5,015,605 A | * | 5/1991 | Frey et al. ................... 264/621 |
| 5,266,222 A | * | 11/1993 | Willis et al. ................ 508/206 |
| 5,624,875 A | | 4/1997 | Soga et al. |

FOREIGN PATENT DOCUMENTS

| DE | 198 32 018 | * | 1/2000 |
| EP | 0196719 | | 10/1986 |
| WO | WO 9829350 | | 7/1998 |

OTHER PUBLICATIONS

Patent Abstracts of Japan, JP 01065030, vol. 013, No. 262, Jun. 16, 1989.
Hayes JD et al., "Sol-gel chemistry-based Ucon-coated columns for capillary electrophoresis," Journal of Chromatography, pp. 3-13, Jul. 18, 1997.

* cited by examiner

*Primary Examiner*—Allan R. Kuhns
(74) *Attorney, Agent, or Firm*—Millen, White, Zelano & Branigan, P.C.

(57) ABSTRACT

The invention relates to the use of gelation moulds made from hydrophobicized glass tubes for the production of monolithic mouldings as sorbents for chromatography.

24 Claims, 2 Drawing Sheets

A

B

PROCESS FOR PRODUCING AN INORGANIC MONOLITHIC MOLDING

The invention relates to the use of gelation moulds made from hydrophobicized glass tubes for the production of monolithic mouldings.

For the chromatographic separation of substance mixtures, the separation materials employed are usually particulate sorbents. For some time, however, porous monolithic mouldings have also increasingly been used in chromatography since they exhibit very good separation efficiencies at the same time as high through-flow rates.

Monolithic mouldings for chromatography ideally have two types of pore-macropores and mesopores.

The separation efficiency of monolithic mouldings is caused by the skeleton density of the structure in combination with a certain size of the macropores. It is important that the skeleton and macropores exhibit the most homogeneous structure possible over the cross section of the column. Inhomogeneities result in worse separation efficiency and worse peak symmetry.

Monolithic mouldings for chromatography can consist of an organic polymer network or of inorganic base materials. Organic polymer mouldings are frequently produced directly in mould materials, such as column tubes. In contrast to the inorganic mouldings, which are substantially inflexible, mouldings made from organic polymers usually exhibit high inherent flexibility.

The hydrogels of inorganic monoliths are formed in gelation moulds and, since shrinkage processes represent a significant proportion in the formation of porous inorganic materials, must be removed from the gelation mould and processed further and clad separately at a later time.

For later shaping and the quality of the mouldings, however, the choice of suitable gelation moulds is a crucial step in the production of materials of this type. Of particular importance here are the following properties of the gelation moulds:

1) The gelation mould must have sufficiently good coefficients of heat transfer. If this is not the case, a temperature gradient forms which, during conditioning, produces monoliths having an inhomogeneous skeleton structure. Differences occur particularly frequently between the edge region and the inner region of the monoliths.
2) The gelation mould must have adequately high thermal stability in order that the mould remains stable during heating.
3) In order to facilitate in-process control, the gelation moulds are ideally transparent.
4) The gelation mould must be of such a nature that interactions of the mould with the reactants present therein during production do not result in inhomogeneities in the edge regions of the mouldings.

No material has hitherto been found for the production of gelation moulds which meets all the above-mentioned requirements and is suitable for the production of qualitatively uniform mouldings.

Although metal tubes have good thermal stability and have good heat transfer, they are not, however, transparent. In addition, the monoliths can frequently only be removed from the tubes with difficulty and exhibit severe irregularities in the gel.

J. of Chrom. 762 (1997), pages 135-146, describes the use of a polycarbonate mould as gelation mould. Polycarbonate tubes are transparent and rigid enough for use as gelation mould, but do not exhibit adequate thermal stability for the production of high-quality mouldings.

Satisfactory results are achieved with PVDF (polyvinylidene fluoride) tubes. However, these tubes are only slightly transparent and change to an orange to brown colour at elevated temperatures, which suggests deficient thermal stability.

Owing to their good thermal stability and thermal conductivity and their transparency, glass tubes appeared ideal as gelation moulds for the production of inorganic mouldings. However, the monoliths produced in glass tubes exhibit considerable inhomogeneity in their skeleton and pore structure and exhibit very poor separation properties in chromatographic tests.

The object of the present invention was therefore to provide a gelation mould which has good properties with respect to thermal conductivity, transparency and thermal stability and with which high-quality monoliths having good separation properties can be produced.

It has been found that the use of glass tubes as gelation mould results in mouldings having excellent separation properties if the surface of the glass tubes has been hydrophobicized in advance. The mouldings produced in this way generally exhibit better chromatographic behaviour than mouldings produced using gelation moulds from the prior art.

The present invention relates to the use of glass tubes which have been hydrophobicized at least on the inside wall as gelation mould for the production of inorganic monolithic mouldings.

A preferred embodiment is the use of a glass tube which has been hydrophobicized by silanisation as gelation mould.

In a preferred embodiment, use is made of a glass tube which has a polar fraction of the free surface energy of less than 1 mN/m$^2$ on the inside.

The present invention also relates to a process for the production of porous inorganic monolithic mouldings by
a) provision of a gelation mould;
b) filling of the gelation mould with monomer sol;
c) polymerisation of the monomer solution;
d) ageing of the gel formed in step c) to form pores, where a glass tube which has been hydrophobicized at least on the inside is provided as gelation mould in step a).

BRIEF DESCRIPTION OF THE DRAWINGS

FIGS. 1 and 2 are explained in greater detail in Example 1.

Figure 1:
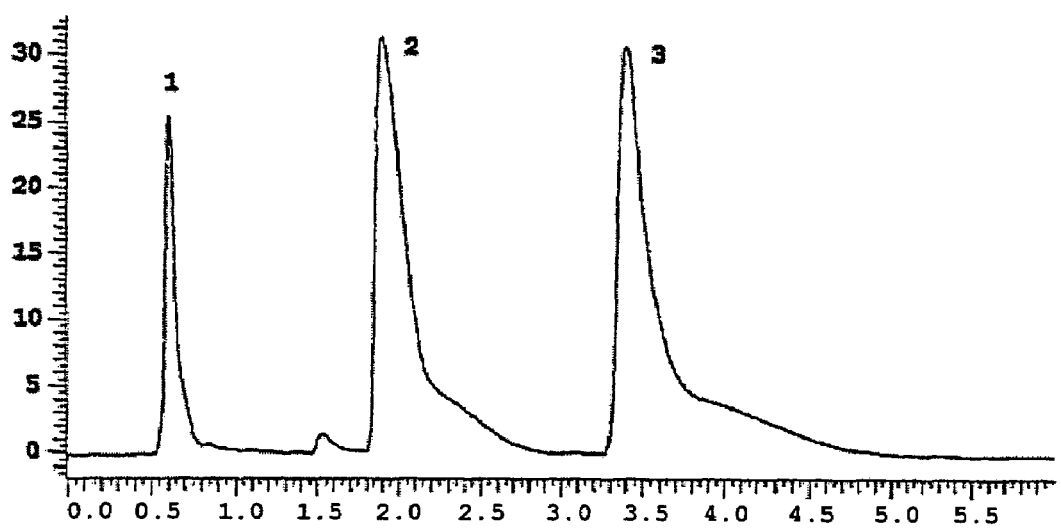
FIGS. 1 and 2 represent chromatograms of separations achieved with sorbents produced by the prior art and by the invention, and are explained in greater detail in Example 1.
Figure 1:
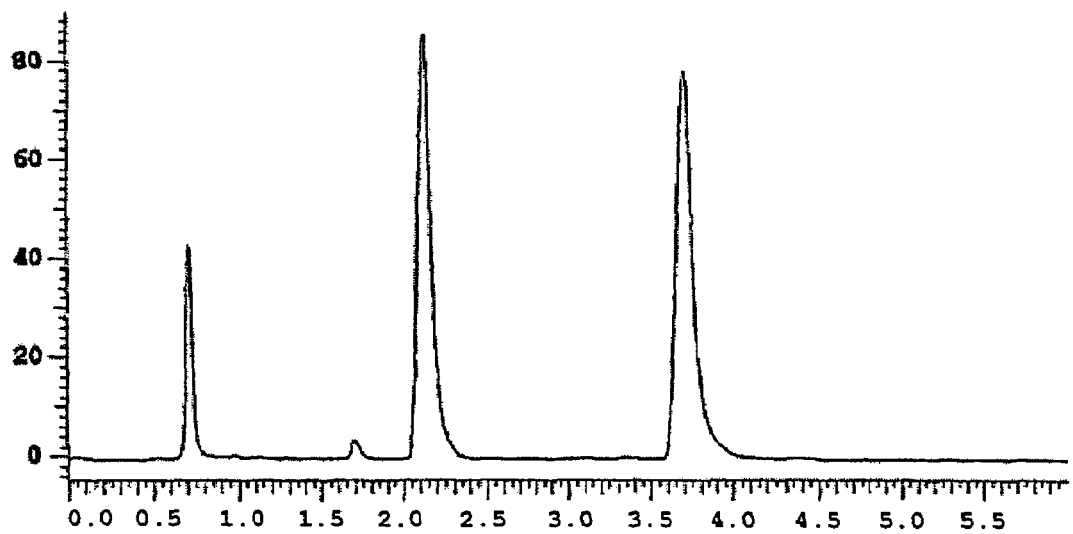

Inorganic porous monolithic mouldings are typically produced by a sol-gel process. The term sol-gel processes is applied to widespread processes in which firstly polymerisable low-molecular-weight species are produced, and finally aggregated or polymerised materials are obtained via polymerisation reactions. Preferred variants of the sol-gel process are disclosed in WO 95/03256 and particularly preferably in WO 98/29350.

The performance of the processes using hydrophobicized gelation moulds does not differ from production using gelation moulds from the prior art.

The gelation mould employed in the production of porous inorganic monolithic mouldings is particularly preferably a hydrophobicized glass tube. The following process steps are typically carried out here:

a) provision of a glass tube which has been hydrophobicized at least on the inside as gelation mould;
b) filling of the gelation mould with monomer sol;
c) polymerisation of the monomer solution;
d) ageing of the gel formed in step c) to form pores.

For the purposes of the invention, the term gelation mould is applied to the mould into which the monolithic mouldings are polymerised during production. After ageing, the shrunk moulding is removed from the gelation mould and re-clad for use as chromatography sorbent. The size and shape of the gelation moulds generally reflect the size and shape of the chromatography columns. Use is therefore typically made as gelation mould of tubes whose length and diameter are in ranges which are customary for analytical or preparative chromatography columns. For certain applications, however, other shapes, such as, for example, angular or planar mouldings, may also be suitable. Thus, although the hydrophobicized glass tube employed in accordance with the invention is preferably round shaped, it does not have a round shape in all cases.

The gelation mould used in accordance with the invention is a glass tube which has been hydrophobicized on both sides or at least on the inside. The degree of hydrophobicization of glass can be described by the free surface energy. Untreated glass tubes exhibit a free surface energy of about 70-90 $mN/m^2$, which is composed to the extent of approximately half each of a polar fraction and a disperse fraction. Hydrophobicization can reduce the polar fraction of the free surface energy. The lower the polar fraction of the free surface energy of the glass gelation moulds, the better properties they exhibit in the production of mouldings. For the purposes of the invention, therefore, the polar fraction of the free surface energy should be less than 10, preferably less than 5, particularly preferably less than 1 $mN/m^2$.

The hydrophobicization of the glass gelation moulds can be carried out by any process which produces hydrophobicization which is sufficiently stable under the moulding synthesis conditions and sufficiently reduces the polar fraction of the free surface energy. For example, derivatisation reactions from the area of silica-gel or silica chemistry, which are used for the derivatisation of sorbents, can be applied to the hydrophobicization of glass. Examples of hydrophobicization methods and corresponding reagents are given in K. K. Unger, "Porous Silica" Elsevier Scientific Publishing Company, 1979, pages 83-130.

The hydrophobicization of the gelation moulds is preferably carried out by silanisation by means of mono-, di- or trifunctional alkoxy- or chlorosilanes. These are preferably silanes containing hydrophobic radicals, such as, for example, alkyl radicals, particularly preferably C8-C25 radicals. For example, octadecyl-modified glass tubes have a polar fraction of the free surface energy of about 0.1 $mN/m^2$.

To this end, the glass tubes are typically treated with a silane in a solvent. After the reaction time, the excess silane is washed out.

The hydrophobicization of the glass surface can just as well be carried out via a multistep process. For example, the glass tubes can firstly, as known for the derivatisation of silica gel, be provided with functional groups, for example epoxides, and, in a subsequent reaction, coated, for example, with sufficiently hydrophobic polymer layers. The polymer layers must of course also meet the above-mentioned requirements with respect to chemical and thermal stability.

A further possibility is the synthesis of prepolymers, such as polysiloxanes or ormocers, which are subsequently mechanically or covalently bonded to the glass surface.

Monolithic mouldings for chromatography which have been produced in hydrophobicized glass tubes as gelation mould exhibit excellent separation properties. The separation properties of mouldings are crucially affected by the uniformity of the skeleton structure. Whereas inhomogeneities in the materials in particulate sorbents are partially compensated via the total column length, this is not the case in monolithic sorbents. Good and uniform detachment from the gelation mould enables the monolith to age uniformly. It is now possible, by means of hydrophobicized glass tubes as gelation mould, to produce mouldings which are homogeneous over the entire region and cross section.

This is also evident in the shrinkage rates. Whereas mouldings produced in polycarbonate tubes only shrink by about 17%, mouldings produced in hydrophobicized glass tubes have shrinkage rates of about 21%.

Even without further comments, it is assumed that a person skilled in the art will be able to utilise the above description in its broadest scope. The preferred embodiments and examples should therefore merely be regarded as descriptive disclosure which is absolutely not limiting in any way.

The complete disclosure content of all applications, patents and publications listed above and below, in particular of the corresponding application DE 100 30 665, filed on 23.06.2000, is incorporated into this application by way of reference.

EXAMPLES

1. Separation of a Substance Mixture in Separating Columns Produced Using Different Gelation Moulds

| | |
|---|---|
| Substance mixture: | thiourea (1), progesterone (2), anthracene (3) |
| Columns: | Chromolith ® Performance RP-18e 100*4.6 mm, C18, end-capped |
| Eluent: | acetonitrile/water 60/40 (v/v) |
| Flow rate: | 2 ml/min |
| Detection: | UV 254 nm |
| Temperature: | room temperature |
| Injection volume: | 10 µl |

The monolithic sorbents were produced by a sol-gel process corresponding to WO 98/29350 and subsequently derivatised with an octadecylsilane. The production was carried out in untreated glass tubes, polycarbonate tubes, PVDF tubes and hydrophobicized glass tubes as gelation mould. The free surface energy of the hydrophobicized glass tube is about 30 $mN/m^2$ (with a polar fraction of less than 1 $mN/m^2$).

Figure 2:
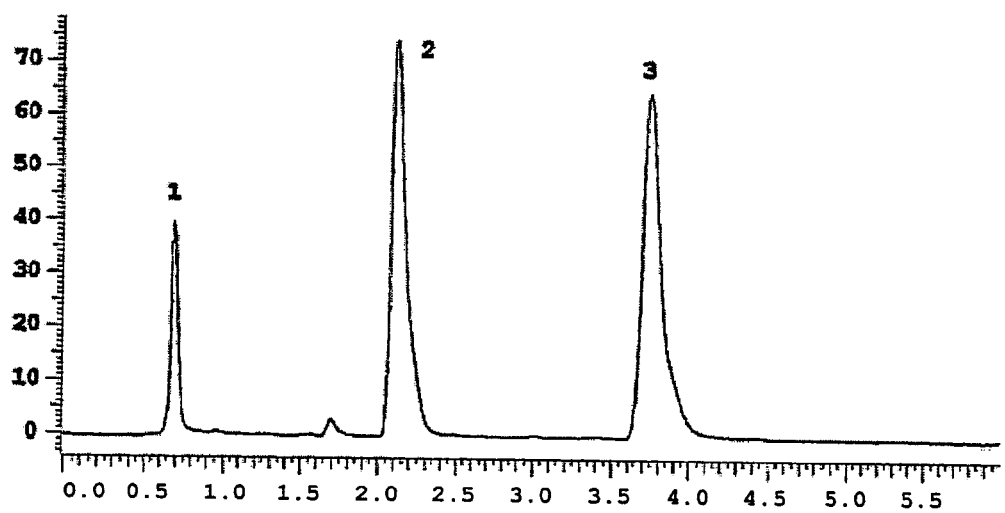
Figure 2:
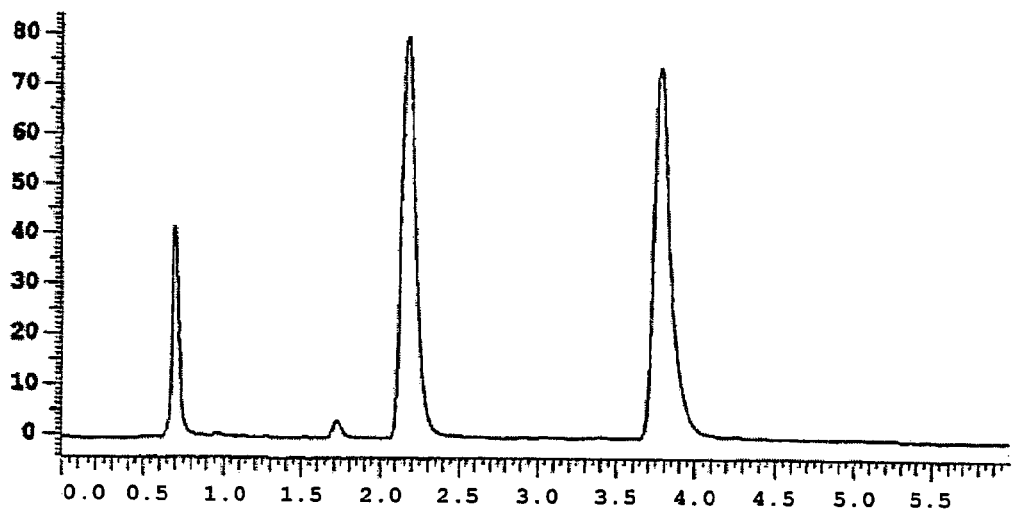

The chromatograms of the separations are shown in FIGS. 1 and 2 (FIG. 1A: untreated glass gelation mould; FIG. 1B: hydrophobicized glass gelation mould; FIG. 2A: polycarbonate gelation mould; FIG. 2B: PVDF gelation mould). The retention time in minutes is shown on the abscissa, and the intensity in mV is shown on the ordinate. Thiourea exhibits a retention time of from 0.6 to 0.7 min, progesterone exhibits a retention time of 2 min and anthracene exhibits a retention time of 3.7 min.

The results are summarised again in the following table. The quality of a monolithic column for HPLC can be described firstly via the separation efficiency N (trays/m) and secondly via the peak symmetry (tailing factor USP). These values are calculated by known methods (for example K. K. Unger, Handbuch der HPLC [Handbook of HPLC], GIT Verlag, 1989).

The table shows a comparison of the separation efficiency and symmetry for peak No. 3:

|  | Glass tube untreated | Polycarbonate | PVDF | Glass tube hydrophobic |
|---|---|---|---|---|
| Separation efficiency [trays/m] | 2000 | 6000 | 7700 | 7900 |
| Symmetry | 5.46 | 1.61 | 1.54 | 1.49 |

It can be seen that the hydrophobicized glass tubes are superior to the other materials. Since they additionally provide significant advantages over plastic moulds through their simple processing, thermal stability and transparency, they are ideally suited as gelation mould for the production of mouldings.

The invention claimed is:

1. A process for producing an inorganic monolithic molding, comprising forming the molding in a glass tube which is hydrophobicized at least on its inside wall with at least one silane comprising a $C_8$-$C_{25}$ alkyl radical wherein the hydrophobicization comprises:
   derivatizing the glass tube with functional groups; and
   coating the glass tube with a hydrophobic polymer layer.
2. A process according to claim 1, wherein the glass tube has been silanized at least on the inside wall.
3. A process according to claim 1, wherein the glass tube has a polar fraction of the free surface energy of less than 1 mN/m² on the inside.
4. A process according to claim 1, wherein the inorganic monolithic molding is porous.
5. A process according to claim 1, wherein the inorganic monolithic molding comprises silica.
6. A process according to claim 1, wherein the glass tube has a polar fraction of the free surface energy of less than 10 mN/m² on the inside.
7. A process according to claim 1, wherein the glass tube has a polar fraction of the free surface energy of less than 5 mN/m² on the inside.
8. A process according to claim 2, wherein the silanization is conducted with a mono-, di- or trifunctional alkoxy- or chiorosilane.
9. A process according to claim 1, wherein an epoxide provides the functional group.
10. A process according to claim 1, wherein coating the glass tube further comprises:
    synthesizing a prepolymer; and
    subsequently mechanically or covalently bonding the prepolymer to the glass surface.
11. A process according to claim 10, wherein the synthesized prepolymer is a polysiloxane or an ormocer.
12. A process according to claim 1, wherein the molding is substantially homogenous over its entire region and cross section.
13. A process for producing a porous inorganic monolithic sorbent for chromatography comprising:
    providing a glass tube that has been hydrophobicized at least on the inside as a gelation mold;
    filling the gelation mold with a monomer sol;
    polymerizing the monomer sol;
    aging the gel formed by polymerizing the monomer sol to form pores;
    removing the polymerized and aged monolithic molding from the gelation mold and re-cladding it for use as chromatography sorbent.
14. A process according to claim 13, wherein the glass tube has been silanized at least on the inside wall.
15. A process according to claim 13, wherein the glass tube has a polar fraction of the free surface energy of less than 1 mN/m² on the inside.
16. A process according to claim 13, wherein the inorganic monolithic sorbent comprises silica.
17. A process according to claim 13, wherein the glass tube has a polar fraction of the free surface energy of less than 10 mN/m² on the inside.
18. A process according to claim 13, wherein the glass tube has a polar fraction of the free surface energy of less than 5 mN/m² on the inside.
19. A process according to claim 14, wherein the silanization is conducted with a mono-, di- or trifunctional alkoxy- or chlorosilane.
20. A process according to claim 13, wherein the glass tube is hydrophobicized by a process comprising:
    derivatizing the glass tube with a functional groups; and
    coating the glass tube with a hydrophobic polymer layer.
21. A process according to claim 20, wherein an epoxide provides the functional group.
22. A process according to claim 20, wherein the glass tube is coated by a process comprising:
    synthesizing a prepolymer; and
    subsequently mechanically or covalently bonding the prepolymer to the glass surface.
23. A process according to claim 22, wherein the synthesized prepolymer is a polysiloxane or an ormocer.
24. A process according to claim 13, wherein the polymerized and aged monolithic molding is substantially homogenous over its entire region and cross section.

* * * * *

UNITED STATES PATENT AND TRADEMARK OFFICE
CERTIFICATE OF CORRECTION

| | |
|---|---|
| PATENT NO. | : 7,238,310 B2 |
| APPLICATION NO. | : 10/311708 |
| DATED | : July 3, 2007 |
| INVENTOR(S) | : Dieter Lubda |

It is certified that error appears in the above-identified patent and that said Letters Patent is hereby corrected as shown below:

Column 5, line 44 reads "chiorosilane" should read -- chlorosilane --
Column 6, line 26 reads "with a functional" should read -- with functional --

Signed and Sealed this

Twentieth Day of May, 2008

JON W. DUDAS
*Director of the United States Patent and Trademark Office*